REUBEN LIGHTHALL, OF BROOKLYN, NEW YORK.

Letters Patent No. 92,065, dated June 29, 1869.

IMPROVED COMPOUND TO BE USED IN THE CURE OF RHEUMATISM.

The Schedule referred to in these Letters Patent and making part of the same.

*To all whom it may concern:*

Be it known that I, REUBEN LIGHTHALL, of Brooklyn, in the county of Kings, and State of New York, have invented certain new and useful Improvements in Appliances for Cure of Rheumatism, and other Diseases of Similar Nature; and I do hereby declare the following is a full and exact description of the same.

It is known and conceded that the diseases above-named are mainly due to the want of the proper electric power in the body; if this can be restored by mechanical, chemical, or other means, that the disease (what it may be) will be removed, and the body restored to its normal condition.

I claim to effect this object in a very simple and inexpensive manner, by the invention that I hereinafter describe.

My invention consists in making a compound of the following articles, in about the proportions named, viz:

Pulverized copper, one part.
Pulverized zinc, one part.
Capsicum, one-half part.

I propose to use these materials, in or about the proportions named, in "pads," to be worn on the soles of the feet and in the palms of the hands, the natural evaporation of the parts coming in contact with the metals making them operative to produce an electric action that can be felt throughout the system.

I am aware that electricity has been used for this same purpose, but the same has been used by machines, which gave so strong a shock to the system that the party receiving it was injured, in place of being benefited by it.

By my invention, this effect is moderate in its operation, and does not produce the effect due to the machines above named.

It is also continuous (when the pads are applied,) and of so slight a nature that the result can only be felt in a very limited degree, producing no shock to the system and yet producing all the effects required for the cure of the diseases named.

What I claim as my invention, and desire to secure by Letters Patent, is—

The appliances for the cure of rheumatism, and other diseases of similar nature, by the materials set forth.

REUBEN LIGHTHALL.

Witnesses:
FRANCIS S. LOW,
G. J. DE LA FIGANIERE.